United States Patent

Chaudhari et al.

[19]

[11] Patent Number: 5,770,826
[45] Date of Patent: Jun. 23, 1998

[54] ATOMIC BEAM ALIGNMENT OF LIQUID CRYSTALS

[75] Inventors: Praveen Chaudhari, Briarcliff Manor; James Andrew Lacey, Mahopac; Shui-Chih Alan Lien, Briarcliff Manor; Curtis E. Farrell, Tarrytown, all of N.Y.

[73] Assignee: International Business Machines Corporation, Armonk, N.Y.

[21] Appl. No.: 644,884

[22] Filed: May 10, 1996

[51] Int. Cl.$^6$ .............................. C07C 1/00; C07F 1/00; G02F 1/1339

[52] U.S. Cl. ................. 204/157.15; 204/157.6; 204/157.63; 349/124; 349/126

[58] Field of Search .................... 349/124, 126; 204/157.15, 157.63, 157.6

[56] References Cited

U.S. PATENT DOCUMENTS

| | | | |
|---|---|---|---|
| 4,030,997 | 6/1977 | Miller et al. | 204/192 E |
| 4,153,529 | 5/1979 | Little et al. | 204/192 EC |
| 5,030,322 | 7/1991 | Shimada et al. | 156/655 |
| 5,032,009 | 7/1991 | Gibbons et al. | 350/341 |
| 5,395,495 | 3/1995 | Nozaki | 204/157.15 |

FOREIGN PATENT DOCUMENTS

| | | |
|---|---|---|
| 1192160 | 8/1985 | Canada . |
| 2815481 | 10/1979 | Germany . |
| 2259725 | 10/1990 | Japan . |
| 3217823 | 9/1991 | Japan . |
| 440422 | 2/1992 | Japan . |
| 463323 | 2/1992 | Japan . |
| 6130391 | 5/1994 | Japan . |
| 6294964 | 10/1994 | Japan . |
| 756172 | 3/1995 | Japan . |

OTHER PUBLICATIONS

DT 2818–079—Siemens, Nov. 1979.
DT 2815–481—Braun AG., Oct. 1979.

*Primary Examiner*—Kathryn L. Gorgos
*Assistant Examiner*—Edna Wong
*Attorney, Agent, or Firm*—Daniel P. Morris

[57] ABSTRACT

We have found that liquid crystals can be aligned on a polyimide surface exposed to a low energy and neutral Argon ion beam. The energy of the incident ions were varied between 75 and 500 eV, the integrated current density from 100 $\mu A/cm^2$ to 500 $mA/cm^2$, and the angle of incidence over which alignment was measured was between 10 and 20 degrees. The pretilt angle of the liquid crystals could be varied between 0 and 8 degrees, by controlling the processing conditions. Degradation of the polyimide, which leads to charge migration, can be avoided by operating at low accelerating voltages.

16 Claims, 6 Drawing Sheets

ATOMIC BEAM ALIGNMENT OF LIQUID CRYSTALS

CROSS REFERENCE TO RELATED APPLICATION

U.S. patent application Ser. No. 08/644,788 entitled, "METHOD AND APPARATUS FOR FORMING AN ALIGNMENT PATTERN ON A SURFACE USING A PARTICLE BEAM USEFUL FOR A LIQUID CRYSTAL", the teaching of which is incorporated herein by reference.

FIELD OF THE INVENTION

The present invention is directed to exposing a surface to a particle beam, such as all atomic or ion beam so that the surface will act as an alignment layer for a liquid crystal material which can be used to form a liquid crystal display cell.

BACKGROUND

Aligned liquid crystals are widely used in flat panel display technology. They are aligned by inducing anisotropy on the surface of a substrate. This surface is usually a polymer such as polyimide, coated on a glass substrate[1] There are a number of ways of introducing anisotropy on the surface: rubbing[2], stretching a polymer[3], a Langmuir-Boldgett film[4], a grating structure produced by microlithography[5], oblique angle deposition of $SiO_x$[6], and polarized UV radiation of polymer films[7]. The pervasive method used in aligning liquid crystal displays available on the market today is rubbing a polyimide film with a velvet cloth. This method has some drawbacks[8]. These include the debris left by the cloth during the rubbing process in an otherwise clean room environment; concern with electrostatic discharging and its influence on the electronic circuitry below the thin polyimide film: and rubbing, being a macroscopic process, does not readily lend itself to aligning liquid crystals in different directions at the spatial size of a pixel, which is usually of the order of a hundred micrometers. This local alignment is desirable to obtain a multidomain structure, which significantly increases the angle of viewing of the display. The limited angle of viewing of current liquid crystal displays is one of the limitations of this technology. We describe a new non-contact method of aligning liquid crystals. This method circumvents the problems posed by the rubbing technique.

References Cited

1. See, for example, D. S. Seo, H. Matsuda, J. Ishizaki, Y. Lamura, and S. Kobayashi, SID Digest 1993, p. 953.

2. See O. Kehmann (1906) and P. Chatelain (1943), cited by P. G. deGennes and J. Prost, "The Physics of Liquid Crystals," Clarendon Press, Oxford (1993) p. 109, 161.

3. H. Aoyama, Y. Yamazaki, M. Matsuura, H. Mada and S. Kobayashi, Mol. Cryst. Liq. Cryst. 72, 127 (1981).

4. H. Ikeno, A. Oshaki, M. Nitto, N. Ozaki, Y. Yokoyama. K. Kakaya, and S. Kobayashi, Jpn. J. Appl. Phys., 27, L475, (1989).

5. M. Nakamura and M. Ura, J. Appl. Phys., 52, 210 (1981).

6. J. Ienuing, Appl. Phys. Lett., 21, 173 (1982).

7. M. Schadt, K. Suhmitt, V. Kozinkov. and V. Chiqvinov, Jpn. J. Appl. Phys., 31, 2155 (1992).

8. S. Kobayashi and Y. Limura, SPIE, 2175, 123 (1994).

9. U.S. Patent Document 5030322, July 1991, Shimada et al.

10. Japan JP 3217923, August 1991.

It is an object of the present invention to provide an improved method of providing a characteristic to a surface to which liquid crystal molecules align.

It is another object of the present invention to provide such characteristic using a particle beam, such as an atomic or ion beam.

SUMMARY OF THE INVENTION

An aspect of the present invention is a method of generating an alignment direction on an alignment surface for a liquid crystal display cell by directing a particle beam at the alignment surface, wherein the particle beam is directed at the surface at an adjustable energy, at an adjustable angle with respect to the alignment surface and at an adjustable time to adjust the pretilt angle of a liquid crystal molecule with respect to the alignment surface.

BRIEF DESCRIPTION OF THE DRAWINGS

Further objects, features, and advantages of the present invention will become apparent from a consideration of the following detailed description of the invention when read in conjunction with the drawing FIGS., in which.

DETAILED DESCRIPTION

A low energy beam of Argon ions is used to bombard the surface of a polyimide film. The Argon beam produces directional alignment when the beam is at an angle other than perpendicular to the surface. The advantages of atomic beam induced alignment over the other techniques are (i) non-contact alignment, (ii) a low energy beam ensures that only the surface layers are effected so that the number of radicals induced by broken bonds, as for example under UV radiation, are a minimum. This avoids charge build up when a voltage is applied across a liquid crystal cell, and (iii) large area uniform and parallel beams can be readily obtained; a problem with oblique deposition of SiOx and, (iv) atomic beams are well known to the electronics manufacturing community and are compatible with a clean room environment, (v) atomic beams can be used to align both surfaces of a thin polymer film, which is self-supporting.

However, in spite of their many advantages, neutral beams of energetic particles can also cause damage of the polyimide resulting in broken bonds which provide a deleterious time dependent response in the liquid crystal when a voltage is applied to operate the display. For this reason it is highly desirable to use a low energy beam; in fact, of energies comprising greater than 25 volts, rather than the hundreds of volts described in the literature[9,10]. These low energy beams modify the surface layer sufficiently to induce alignment without any measurable degradation. We shall present experimental data to support this conclusion.

Figure 1:
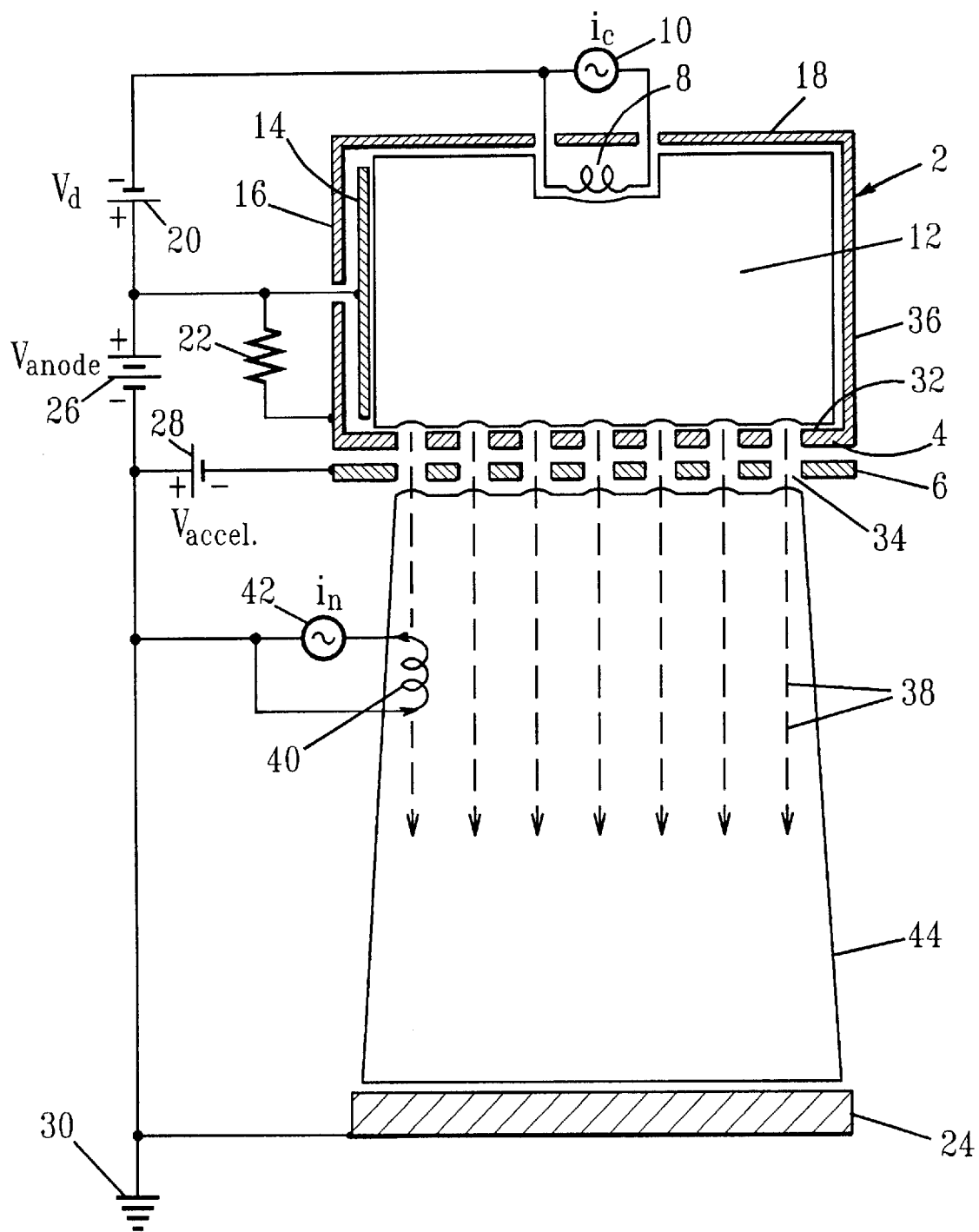
FIG. 1 is a schematic drawing of the ion beam system used for the purpose of this invention.

A schematic drawing of the ion beam system used for the purposes of this invention is shown in FIG. 1. The ion source is commercially available and the accelerating voltage in this source could be varied from 75V to 500V. The current density, or the number ions, per square cm was approximately 100–500µA per sq. cm. and was one of the variables that was investigated. The substrate, which was bombarded with the atomic beam was made of glass on which indium tin oxide and polyimide films had been deposited. Substrates containing thin film transistors covered by a polyimide film were also investigated. A mylar film, which is self-supporting was investigated. These are exemplary only and not limiting. These substrates were placed at various angles to the incoming atomic beam shown in FIG. 1. Argon gas was used as the plasma source. The ion beam apparatus and its operation are well known in the semiconductor industry.

FIG. 1 shows a schematic of the physical and electrical configuration of a Ion Source. The principals of operation are best understood by realizing that an ion source consists of three regions. Ions are generated in the discharge plasma region (12), accelerated through the extraction region (6) and travel trough the beam plasma region (44).

Ions are generated in the discharge plasma region (12) by electron bombardment of neutral gas atoms. Electrons are emitted by a hot filament, cathode (8), and accelerated by a potential difference, Vd (20), between the cathode (8) and anode (14). This voltage is typically about 40V, which is several times higher then the Ar ionization voltage of 15.8 eV, and is used to establish a glow discharge. Before the discharge starts, the source body (2) is at the anode (14) potential. After the discharge starts, however, the connecting resistor (22) allows the source body (2) and the screen grid (4) to float to the cathode potential, directing the discharge current to the anode. The discharge plasma (12) establishes itself between the cathode (2), anode (14), chamber walls (16, 18, 36 and 32) and the screen grid (4).

To extract the ion beam from the discharge plasma, we raise the anode voltage, Vanode (26) to a positive voltage above ground. Raising the anode potential increases the plasma potential to nearly the same value. Thus any ion leaving the discharge plasma and striking the grounded target (24) surface arrives with the energy determined by the anode potential. The extraction grid (6) is held at a negative potential and the ions pass through the apertures (34) in the accelerator grid, not shown, without striking it and form a collimated beam (44), eventually striking the target (24) which is held, at ground potential (30).

Since the substrates we use are insulating, when the ion beams hit the substrates, there is no current path available for the electron flow to meet the incoming flux of positive ions and the insulating surface would charge positive. To eliminate this charging, a hot filament or neutralizer (42) is immersed in the collimated beam (44) which adequately supplies electrons to any region of the beam or the substrate surface which would charge positive.

After exposure to ion beams a pair of glass plates were assembled together with a five micron spacer. The space between the two plates was evacuated and subsequently filled with a nematic liquid crystal. It was observed that the liquid crystal was aligned by the atomic beam in much the same way that rubbing by a cloth does.

Figure 2:
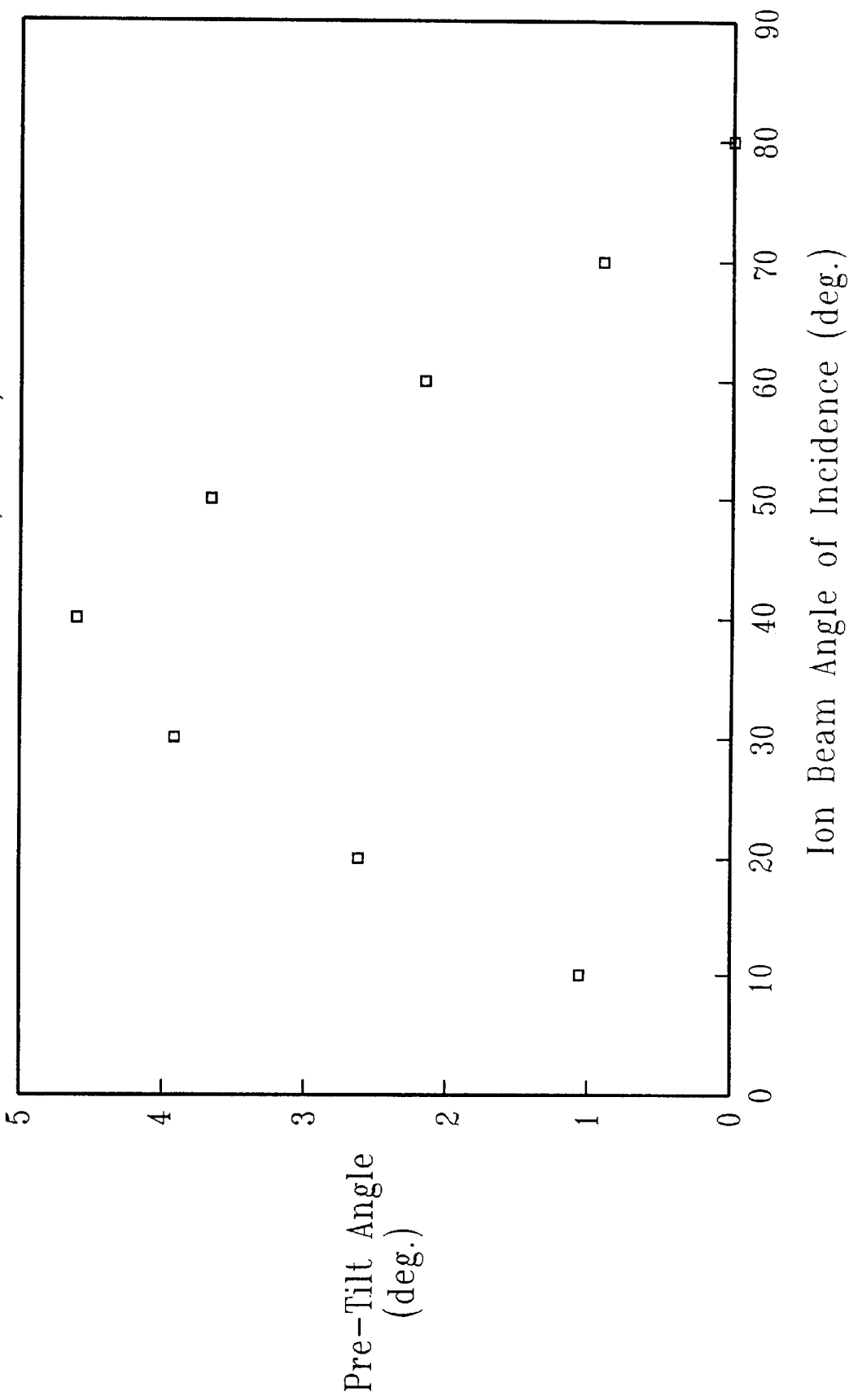
FIG. 2 is a plot of pretilt angle as a function of the angle of incidence of the incident beam as shown in FIG. 6.
Figure 3:
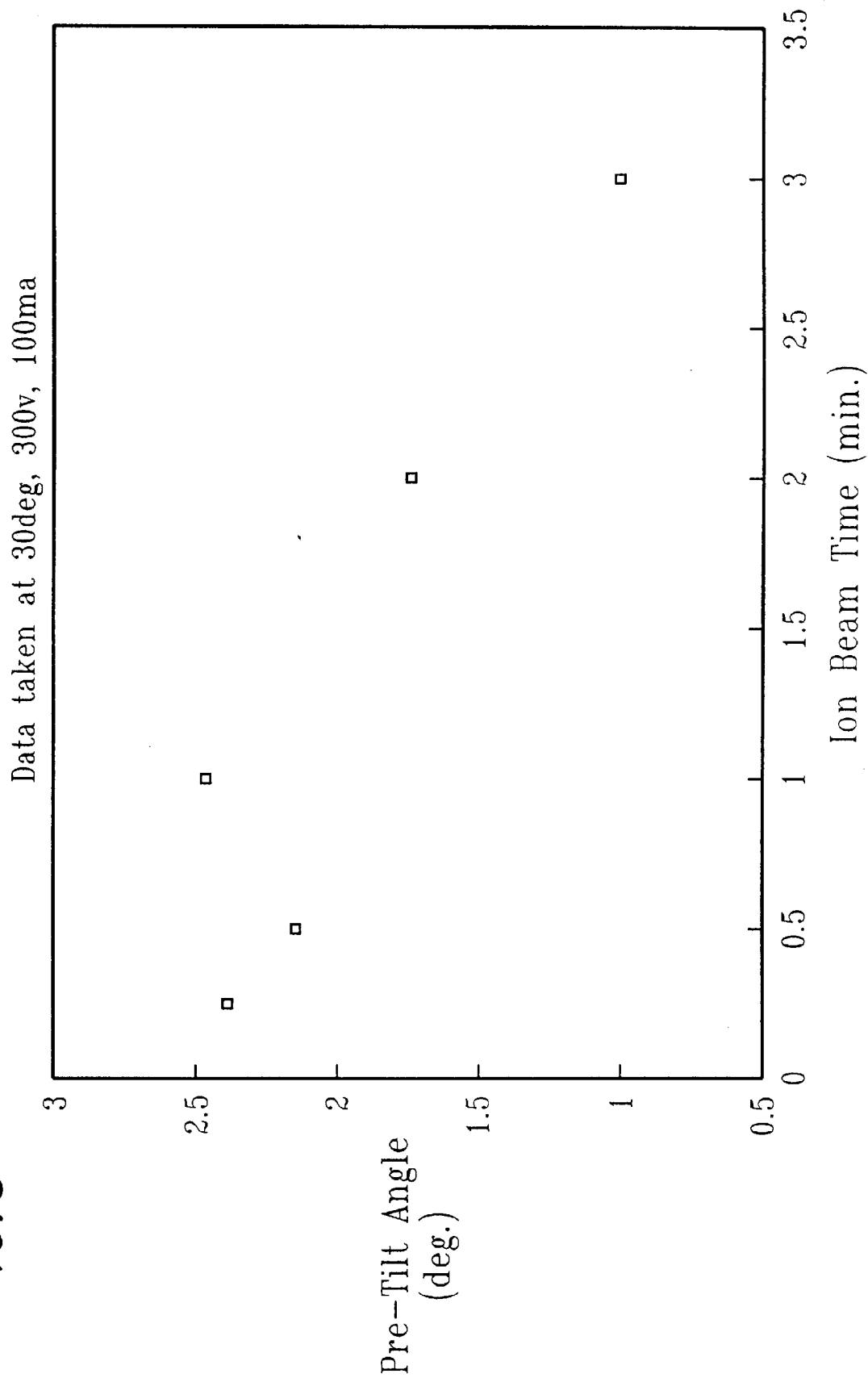
FIG. 3 is a plot of pretilt angle with time of exposure to incident beam.
Figure 4:
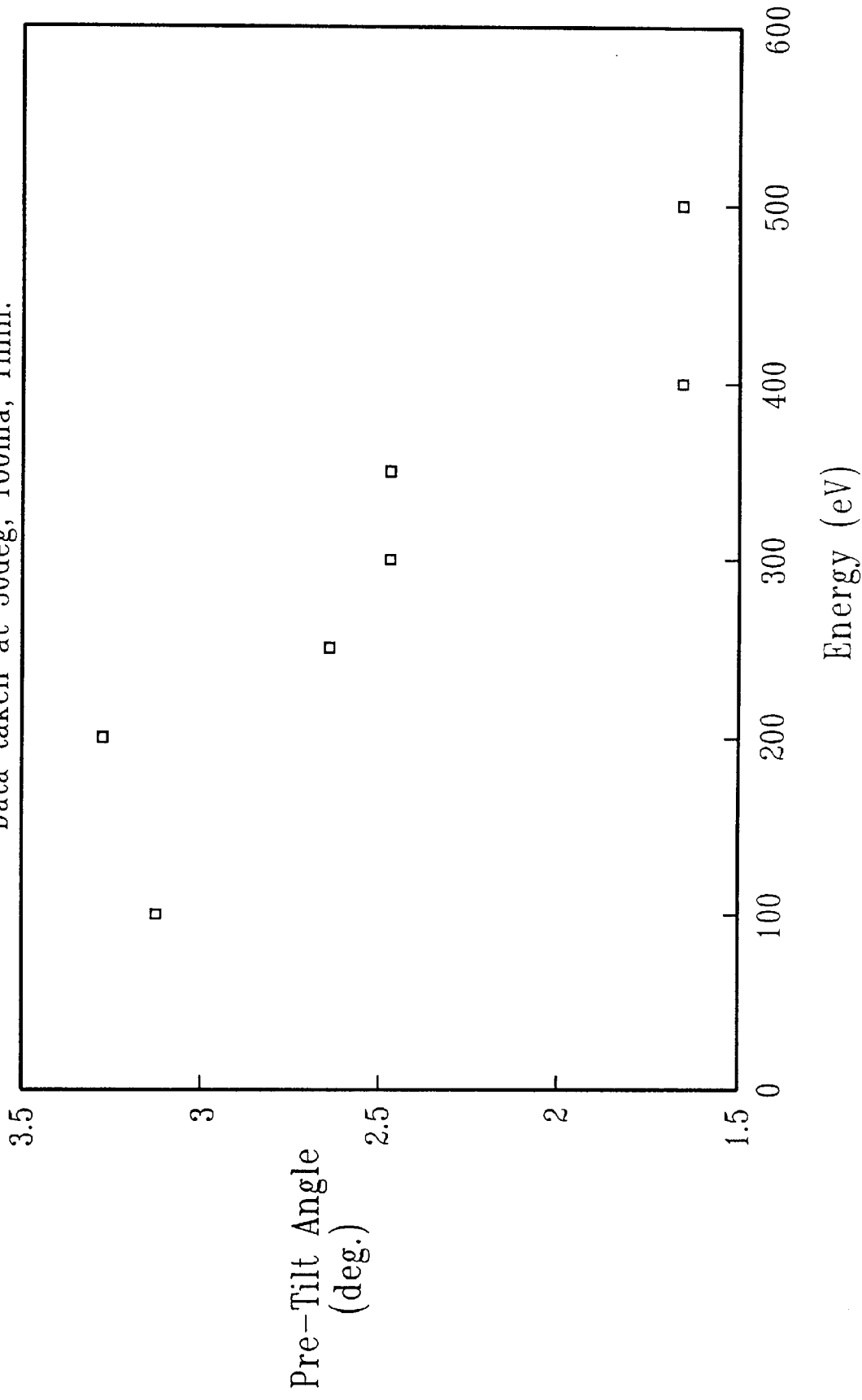
FIG. 4 is a plot of pretilt angle with accelerating voltage.
Figure 6:
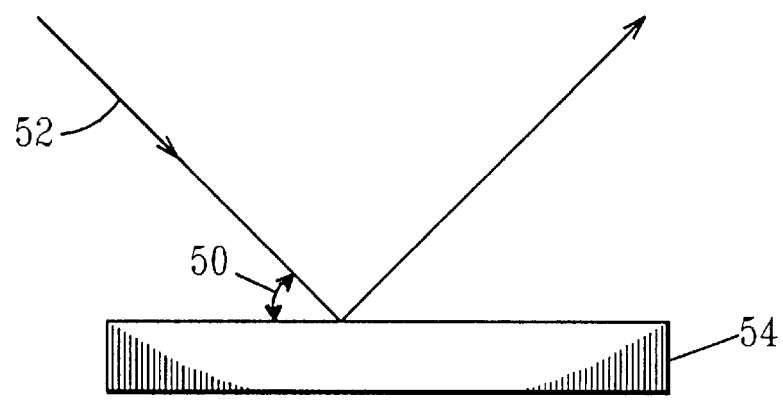
FIG. 6 schematically shows a beam according to the present invention incident on a surface of a substrate being exposed.
Figure 7:
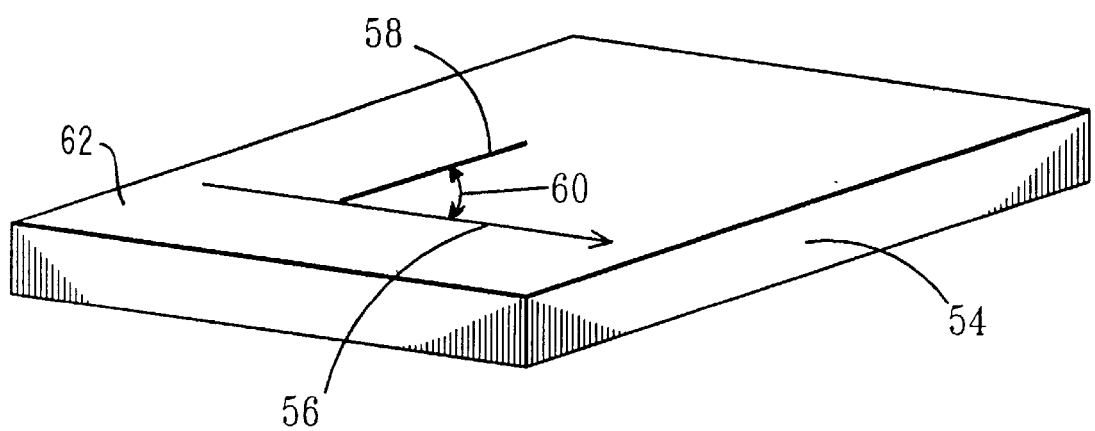
FIG. 7 schematically shows the pretilt angle of a liquid crystal molecule.

The alignment was strong and a measure of considerable interest to the display technology community, called the tilt angle, was also determined as a function of the angle, time, and energy of the beam. For active matrix liquid displays it is desirable to have the pretilt angle be larger than a few degrees. The operation of a liquid crystal display and tilt angle are described in U.S. application Ser. No. 08/194,239 filed Feb. 20, 1994 and assigned to the assignee of the present invention, the teaching of which is incorporated herein by reference. FIG. 7 schematically shows substrate 54 of FIG. 6 with the alignment directory 56 formed by the method of the present invention with a liquid crystal molecule schematically shown as 58 which make an angle 60 with respect to surface 62 of Substrate 54. Angle 60 is the pretilt angle. We show in FIG. 2 that pretilt angle as a function of the angle 50 of the incident beam 52 with respect to substrate 54. This is shown for two accelerating voltages. There is a maximum in the value of the pretilt al 45 degrees. We show in FIG. 3 that the variation in the value of pretilt angle with time of exposure at a constant beam current. Finally, in FIG. 4 we show how the pretilt angle changes with the accelerating voltage.

Figure 5A:
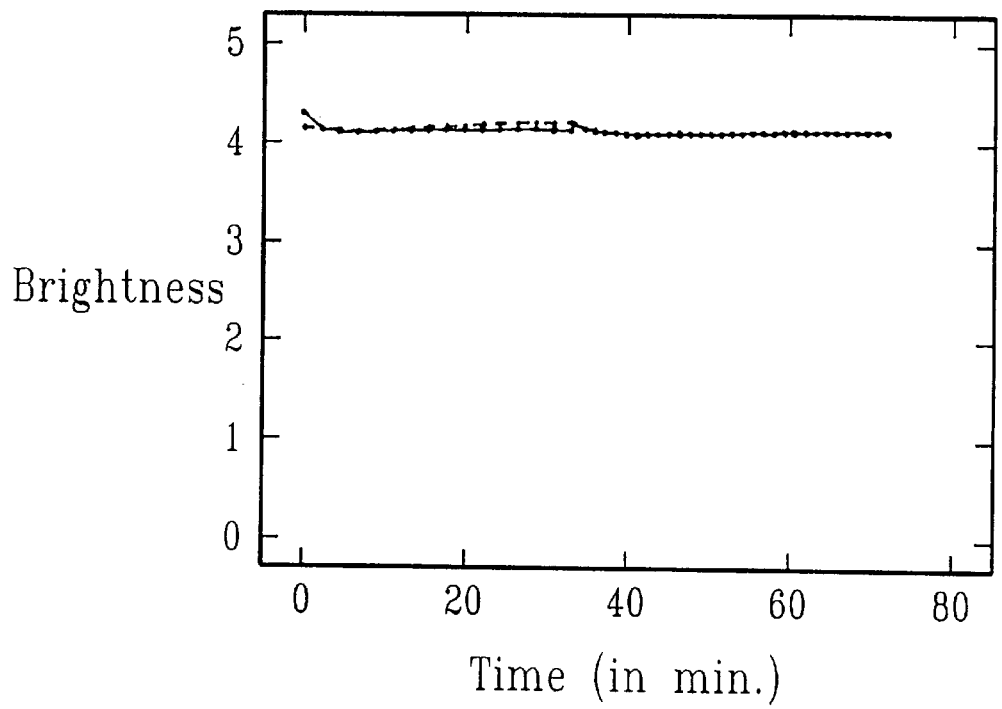
FIG. 5 show the brightness vs. time of a substrate exposed according to the present invention used in a liquid crystal cell.
Figure 5B:
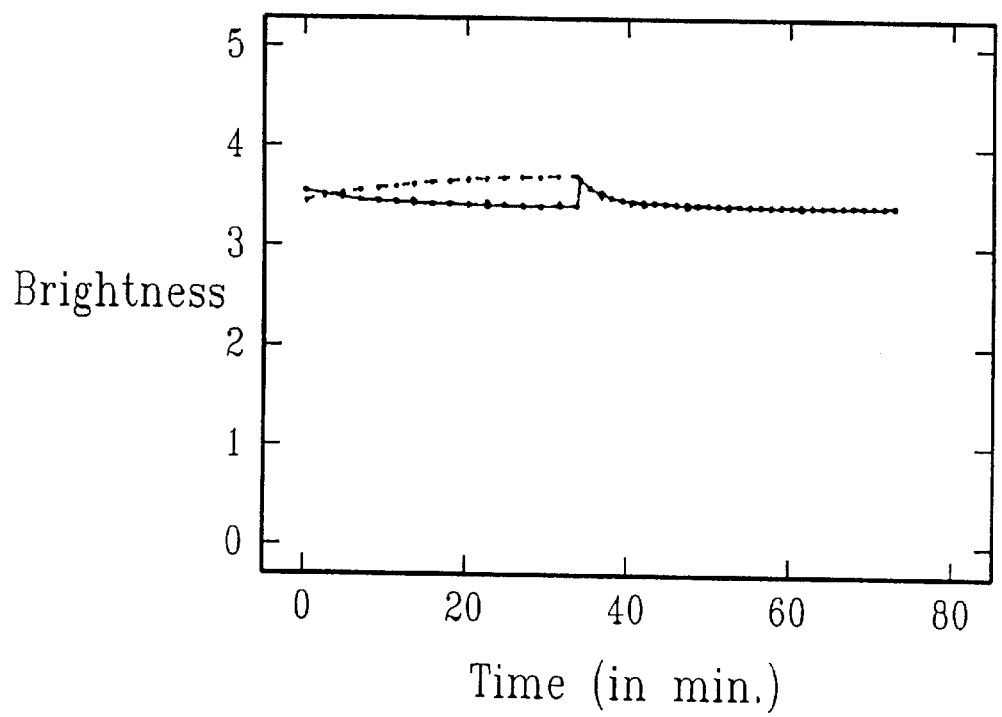

It is clear from these measurements that the pretilt angle satisfies the needs of display technology and that its variation with atomic beam parameters such as voltage and current are controllable. We next investigated the effects of ion beam accelerating voltages on the temporal response of a display device under a voltage. In this crucial test we search for stray charge either in the polyimide or the liquid crystal cell. As we keep the latter constant, i.e. independent of the ion beam processing parameters any time dependent effect we observe is associated with charge migration in the polyimide. The results of a test carried Out after a 75V ion beam alignment procedure showed no evidence of charge accumulation whereas the results from a 200V did. This is shown in FIG. 5(a) and 5(b).

These measurements clearly show that the atomic beam alignment technique can be used to align liquid crystal displays provide the accelerating voltage is kept low. For polyimide and argon ions this is below 200V.

We have found that mylar object can also be used to align liquid crystals. A two micron thin sheet of mylar was stretched across a rectangular frame and both surfaces of the mylar were exposed to a 200V beam. This mylar sheet was then sandwiched between two polyimide coated glass plates to form a paper-like display as taught in U.S. application Ser. No. 08/644,556 entitled, "STACKED PARALLAX-FREE LIQUID CRYSTAL DISPLAY CELL", to A. Lowe filed on May 10, 1996 , the teaching of which is incorporated herein by reference.

While the present invention has been described with respect to preferred embodiments, numerous modifications, changes, and improvements will occur to those skilled in the art without departing from the spirit and scope of the invention.

We claim:

1. A method of generating an alignment direction on an alignment surface for a liquid crystal display cell comprising:

directing a particle beam at said alignment surface;
   said particle beam is directed at said surface at an adjustable energy using a voltage less than about 200 V, at an adjustable angle with respect to said alignment surface and at an adjustable time to adjust the pretilt angle of a liquid crystal molecule with respect to said alignment surface to be larger than a few degrees to which said liquid crystal molecule is aligned.

2. A method according to claim 1, wherein said alignment surface is a polymer surface.

3. A method according to claim 2, wherein said polymer surface is a polyimide.

4. A method according to claim 2, wherein said polymer surface is a mylar surface.

5. A method according to claim 1, wherein said particle beam is a beam of particles selected from the group consisting of ions and neutral particles.

6. A method according to claim 5, wherein said particle beam is selected from the group consisting of atomic beams, ion beams, molecular beams, electron beams and elementary particle beams.

7. A method according to claim 1, wherein said particle beam has a value of said adjustable energy, a value of said adjustable angle, and a value of said adjustable time to result in said particle beam interacting only within a distance from said surface sufficient to result in said alignment direction but insufficient to introduce defects in said alignment surface.

8. A method according to claim 7, wherein said defects are charge stored in said alignment surface.

9. A method according to claim 1, wherein said adjustable energy is greater than 10 volts.

10. A method according to claim 1, wherein said adjustable angle is from about 0° to about 90°.

11. A method according to claim 1 further including incorporating said alignment surface in a liquid crystal display.

12. A method of generating an alignment direction on an alignment surface for a liquid crystal display cell comprising:

directing a particle beam at said alignment surface at a voltage less than about 200 V;

said particle beam is directed at said surface at an adjustable energy to adjust a pretilt angle of a liquid crystal molecule with respect to said alignment surface to be larger than a few degrees and to which said liquid crystal molecules is aligned; and incorporating said alignment surface in a liquid crystal display cell.

13. A method of generating an alignment direction on an alignment surface for a liquid crystal display cell comprising:

directing a particle beam at said alignment surface at a voltage less than about 200 V;

said particle beam is directed at said surface, at an adjustable angle with respect to said alignment surface to adjust a pretilt angle of a liquid crystal molecule with respect to said alignment surface to be larger than a few degrees and to which said liquid crystal molecules is aligned; and incorporating said alignment surface in a liquid crystal display cell said liquid crystal molecules having a pretilt angle greater than a few degrees.

14. A method comprising:

directing a particle beam at a voltage less than about 200 V at a surface at an energy, angle and for a time to generate at said surface properties to induce liquid crystal molecules to align at said surface when said surface is exposed to said liquid crystal molecules, said molecules having a pretilt angle greater than a few degrees and to which said liquid crystal molecules are aligned.

15. A method of generating an alignment direction on an alignment surface for a liquid crystal display cell comprising:

directing a particle beam at said alignment surface at a voltage less than about 200 V;

said particle beam is directed at said surface for an adjustable time to adjust a pretilt angle of a liquid crystal molecule with respect to said alignment surface; and incorporating said alignment surface in a liquid crystal display cell.

16. A method of generating an alignment direction on an alignment surface for a liquid crystal display cell comprising:

directing a particle beam at said alignment surface at a voltage less than about 200 V;

said particle beam is directed at said surface to adjust a pretilt angle of a liquid crystal molecule with respect to said alignment surface to be larger than a few degrees and to which said liquid crystal molecules are aligned.

* * * * *